Feb. 18, 1941.     L. HÉBRARD     2,232,455
SPECTACLES OR GOGGLES
Filed Oct. 16, 1937
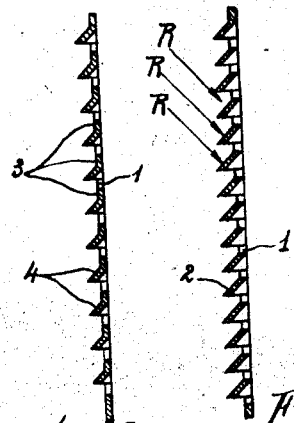
Fig.3
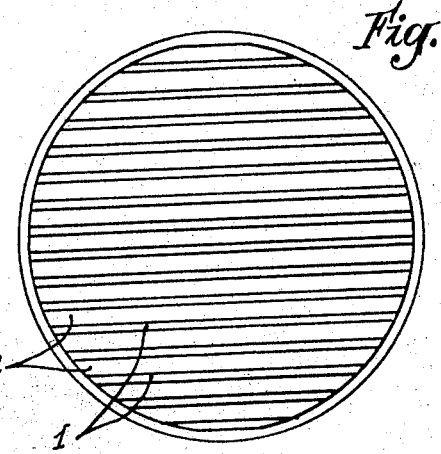
Fig.2   Fig.1
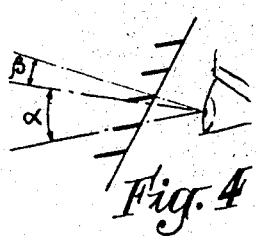
Fig.4
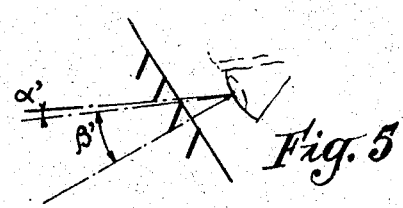
Fig.5
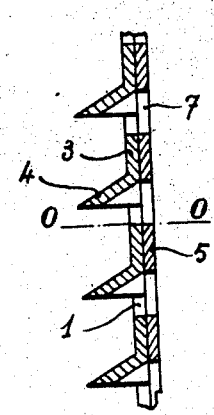
Fig.6
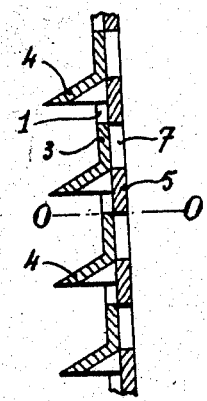
Fig.7
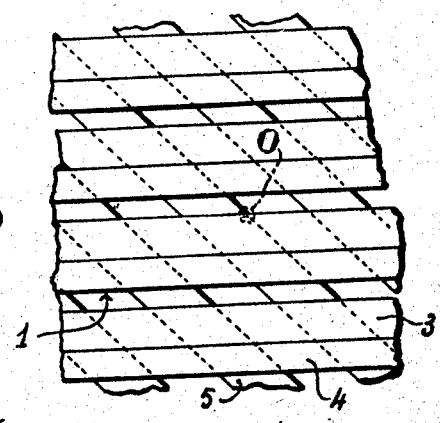
Fig.8
INVENTOR:—
Léon Hébrard
By Alexander Powell
ATTORNEYS Patented Feb. 18, 1941

2,232,455

UNITED STATES PATENT OFFICE 2,232,455

SPECTACLES OR GOGGLES

Leon Hébrard, Lyon, Rhone, France

Application October 16, 1937, Serial No. 169,509
In Germany October 20, 1936

6 Claims. (Cl. 2—14)

My invention relates to goggles or spectacles for protecting the user against the dazzling action of intense light.

The spectacles generally used for this object comprise coloured lenses made of glass. They are dangerous on account of the risk of breakage. It has been proposed to substitute cellulosic derivatives for the glass, but the lenses then are rapidly scratched. On the other hand the known goggles modify the hues and their lenses are easily stained and have to be frequently cleaned.

It has been proposed to use metallic plates perforated with a large number of fine holes. But these holes are easily clogged by dust or dirt and they are not easily cleaned. When the plate is not extremely thin, the edges of the holes are brilliant and are themselves a source of glare.

A first object of my invention is to provide spectacles with perforated plates which will not easily become clogged by dirt.

A further object is to avoid the glare caused by the brilliant edges of the perforations.

Still another object of my invention is to provide spectacles with perforated plates in which the perforations are adjustable at will, such adjustment being equally effective over the hole area of the plate.

According to my invention the plates are provided with fine parallel slits, disposed horizontally, the upper edge of each slit projecting slightly beyond the lower edge thereof, and there is associated with each such plate a rotatable plate, provided with slits able to register with the slits of the first plate, the center of rotation of the said rotatable plate being preferably located along one edge of one of the slits.

In the annexed drawing:

Fig. 1 is a front view of a plate for spectacles according to my invention.

Fig. 2 is a cross-section thereof.

Fig. 3 is a cross-section of a modification thereof.

Figs. 4 and 5 are diagrammatical views illustrating the effect of the plate on the eye of the wearer.

Fig. 6 is a partial sectional view of a plate of the kind shown in Fig. 3, associated with a rotatable plate, the latter being shown at the position corresponding to the full opening.

Fig. 7 is a similar view at the position corresponding to the closed position.

Fig. 8 is a partial front view at an intermediate position of the plate.

The circular plate shown in Figs. 1 and 2 is made of opaque or semi-opaque material such as metal, strongly coloured cellulosic derivatives, synthetic resins, etc. This plate has a series of equidistant parallel slits 1, separated from one another by plain portions 2 which are inclined with respect to the plane of the plate, the upper edge of each slit thus projecting beyond the lower edge thereof, as in window shutters, for instance. Slits 1 are narrow and in large number.

In the modification of Fig. 3, the plain portions between the successive slits comprise an upper part 3 in the plane of the plate and a lower part 4 inclined forward.

When plates such as described are mounted in the frame of a pair of spectacles, they decrease the intensity of the light received by the wearer's eyes without hindering clear vision owing to the fineness and proximity of the slits. They are not liable to break as the spectacles with coloured glass lenses and the slits are not so easily clogged as the circular holes of the known perforated plates. The edges of the slits cannot receive the rays R (Fig. 2) from the sun or from a brilliant sky. They are not therefore liable to become a source of glare.

The angle of the beam of light passing through the slits 1 varies according to the inclination of the average visual ray with respect to the plane of the plate. When the wearer raises his head (Fig. 4) the useful angle $\alpha$ (angle of the beam admitted by a slit) is large with respect to the dead angle $\beta$; the spectacles are clear. When the wearer's head is lowered (Fig. 5), the useful angle $\alpha'$ is reduced with respect to the dead angle $\beta'$; the spectacles are dim. The wearer is thus able to adjust at will the efficiency of the spectacles.

There is preferably associated with each plate as described, a second plate rotatably carried by the frame. This second plate 5 (Figs. 6 to 7) is provided with parallel slits 7 having substantially the same width as the slits 1 of the fixed plate and disposed at the same distance apart; but slits 7 have no projecting edge. Plate 5 is disposed against the inner face of the fixed plate.

Plate 5 is preferably in the form of a disc loosely carried within the frame, the center of this disc being located at O along the edge of a slit 1 and of a slit 7.

For a given angular position of the rotatable plate, the slits 1 and 7 of both plates are registering together (Fig. 6). The spectacles are then very clear. By rotating plate 5 through 180° the plain portions of plate 5 are brought before the slits 1 of the fixed plate and the spectacles are wholly opaque (Fig. 7). At any intermediate position (Fig. 8) the combined plates show a series of openings in the form of lozenges, identical with each other and regularly disposed over the whole area of the plates. The dimensions of these lozenges may be varied at will by rotating the movable plate, which permits of adjusting at will the efficiency of the spectacles.

It is essential to note that the above-described adjustment affects regularly the whole area of the plate, no portion thereof being rendered dimmer than another one.

I claim:

1. Spectacles or goggles for personal wear comprising a frame, and plates of non-transparent material in said frame provided with a plurality of fine parallel horizontal slits, the upper edges of the said slits projecting beyond the lower edges thereof and the slits being so proportioned as to leave narrow clear vision passages for rays disposed normal to the plate.

2. Spectacles or goggles for personal wear comprising a frame, and plates of non-transparent material in said frame provided with a plurality of fine parallel horizontal slits, the plain portions between the successive slits each comprising an upper part in the plane of the plate and a lower part oblique with respect to said plane and projecting forward with respect to the wearer's eye, and the slits being so proportioned as to leave narrow clear vision passages for rays disposed normal to the plate.

3. A device for use in spectacles or goggles, comprising in combination a fixed plate made of non-transparent material, provided with fine parallel slits of equal widths; and a rotatable plate disposed against said fixed plate, said rotatable plate being also provided with corresponding slits which, for a given angular position of said rotatable plate, are in registration with the said slits of said fixed plate, rotation of the rotatable plate simultaneously equally affecting the sizes of the openings between the slits throughout the entire area of the fixed plate.

4. In a device as claimed in claim 3, the center of rotation of said rotatable plate being located along one edge of a slit on said fixed plate and on said rotatable plate, and the rotatable plate being rotatable through an arc of 180° from the registering position of the slits.

5. A device for use in spectacles or goggles, comprising in combination a fixed plate made of non-transparent material, provided with fine parallel horizontal slits of equal widths, the material at the upper edge of each slit projecting forward with respect to the wearer's eye while the material at the lower edge of each slit is substantially in the plane of said plate; and a rotatable plate disposed against the flush face of said fixed plate, said rotatable plate being also provided with corresponding slits which, for a given angular position of said rotatable plate, are in registration with the said slits of said fixed plate, rotation of the rotatable plate simultaneously equally affecting the sizes of the openings between the slits throughout the entire area of the fixed plate.

6. In a device as claimed in claim 5, the center of rotation of said rotatable plate being located along one edge of the material at a slit in said fixed plate and said rotatable plate, and said rotatable plate being rotatable through an arc of 180° from the registering position of the slits.

LÉON HÉBRARD.